Figure 1:
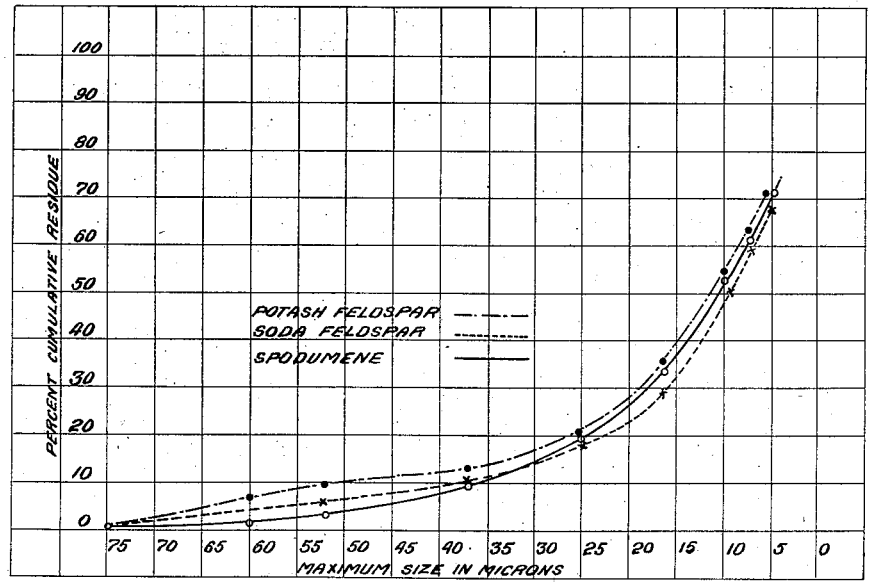

Oct. 21, 1941.  B. C. BURGESS ET AL  2,260,000
CERAMIC COMPOSITION
Filed April 16, 1938  2 Sheets-Sheet 1

TRIAXIAL DIAGRAM OF TERNARY SYSTEM
SPODUMENE, POTASH FELDSPAR & SODA FELDSPAR

INVENTORS
BLANDFORD C. BURGESS
JOHN E. BOYD, JR.
BY Sager & Malcolm
ATTORNEYS

Oct. 21, 1941.   B. C. BURGESS ET AL   2,260,000
CERAMIC COMPOSITION
Filed April 16, 1938   2 Sheets-Sheet 2

CURVES SHOWING PYROMETRIC PROPERTIES OF MIXTURES
OF FELDSPARS + FELDSPARS WITH SPODUMENE

TRIAXIAL DIAGRAM WITH P.C.E.
CONTOUR LINES

INVENTORS
BLANDFORD C. BURGESS
JOHN E. BOYD, JR.
BY Sager & Malcolm
ATTORNEYS

Patented Oct. 21, 1941

2,260,000

UNITED STATES PATENT OFFICE 2,260,000

CERAMIC COMPOSITION

Blandford C. Burgess and John E. Boyd, Jr., Spruce Pine, N. C., assignors to Feldspathic Research Corporation, New York, N. Y., a corporation of Delaware Application April 16, 1938, Serial No. 202,467

11 Claims. (Cl. 106—39)

This invention relates to the art of ceramics and has for its objects to provide novel ceramic compositions having special properties which render them particularly useful in the manufacture of whiteware bodies, glazes and enamels, and to provide novel ceramic bodies such as porcelain, tile, tableware, etc., manufactured from such compositions.

The invention is based upon the discovery that by adding spodumene, a lithia bearing aluminum silicate mineral, to aluminum silicate minerals containing potash and soda, such as feldspar, nepheline, and leucite, it is possible to produce ceramic compositions having pyrometric cone equivalents (P. C. E.) considerably lower than either the spodumene or potash soda silicate minerals alone. The economic advantages resulting from such decrease in the firing temperature of the ceramic batch, and from the ability to control the firing temperature by proper proportioning of the mixture, are readily apparent to those skilled in the art.

The novel ceramic compositions hereinafter described comprise mixtures of aluminum silicate minerals containing lithia, potash and soda, such, for example, as mixtures of potash feldspar, soda feldspar, and spodumene. The mixtures may be prepared by mixing pure spodumene or spodumene concentrates with the necessary other minerals in proportions required to produce a ceramic composition having the desired properties. Another method of preparing such compositions is to use a naturally occurring mixture of these minerals and adding thereto the necessary other minerals required to make up a composition having the desired properties.

The mixtures above described may either be prepared from crude or partially ground minerals, and the mixtures then ground to the desired fineness; or the individual minerals or mixtures of minerals may be ground separately before they are mixed to make up the desired composition. Likewise, the ceramic bodies of this invention may be made from the spodumene as it naturally occurs associated with feldspar, quartz, etc., in pegmatite formation or from spodumene concentrates from such formations. If the pegmatite material is used the spodumene present will provide $Li_2O$ content from about .50% up to about 4%. If, however, spodumene concentrates are used these will provide $Li_2O$ content up to that approaching the pure mineral, which is 8.4%. The silica content may vary from about 64% to 78%, and the alumina from about 15% to 30%.

The following analysis is typical of the composition of the spodumene pegmatite material:

TABLE No. 1

| | |
|---|---|
| $SiO_2$ | 73.80 |
| $Al_2O_3$ | 17.69 |
| $Fe_2O_3$ | 0.45 |
| $CaO$ | 0.10 |
| $Li_2O$ | 1.82 |
| $K_2O$ | 2.65 |
| $Na_2O$ | 2.50 |
| Loss | 0.79 |
| | 99.80 |

The type of spodumene concentrates which are available may be illustrated by the following analysis:

TABLE No. 2

| | |
|---|---|
| $SiO_2$ | 64.06 |
| $Al_2O_3$ | 29.00 |
| $Fe_2O_3$ | .20 |
| $CaO$ | .14 |
| $MgO$ | .07 |
| $K_2O$ | .51 |
| $Na_2O$ | .15 |
| $Li_2O$ | 5.41 |
| Loss | .64 |
| | 100.18 |

We shall first describe a number of tests which have been made with various mixtures of spodumene and potash and soda feldspars, illustrating the advantages of our invention. The spodumene used in assembling the data hereinafter given by way of example, and illustrated graphically in the drawings, was sorted by hand from pegmatite obtained from the North Carolina Kings Mountain district. It was crushed to −½ inch and all pieces containing impurities were discarded. The crushed material was then calcined to 2100° F. to convey it to beta spodumene which does not expand noticeably upon further heating. The calcined material was then ground in a laboratory porcelain pebble mill to 230 mesh. The two samples of feldspar used were likewise carefully selected, crushed and ground to the same mesh. To be sure that the three materials were of the same fineness, particle size distribution tests were made and differences in grinding were corrected by further grinding of the coarser samples until all of them corresponded closely. Curves showing particle size distribution of the three samples are shown in Fig. 1.

Chemical analyses of the three materials were also made. These are given below in Table No. 3:

TABLE No. 3

|  | Spodumene | Potash feldspar | Soda feldspar |
|---|---|---|---|
| $SiO_2$ | 63.84 | 66.72 | 66.22 |
| $Al_2O_3$ | 28.61 | 18.52 | 21.76 |
| $Fe_2O_3$ | .19 | .08 | .04 |
| $CaO$ | .04 | .30 | 2.06 |
| $MgO$ | Tr. | Tr. | Tr. |
| $K_2O$ | .00 | 12.10 | .41 |
| $Na_2O$ | .00 | 1.82 | 9.37 |
| $Li_2O$ | 7.26 | .00 | .00 |
| Loss on ignition | .16 | .36 | .16 |
|  | 100.10 | 99.90 | 100.02 |

All fusion tests were made in a muffle type gasoline fired laboratory test kiln, equipped with a pyrometer and suitable "peep hole," for observing the cones as they deformed. The temperatures was taken up rapidly to 1500° F. after which it was increased at rate of 300° F. per hour. Several fusions were made. These were heated as nearly on the same schedule as was practical.

Figure 2:
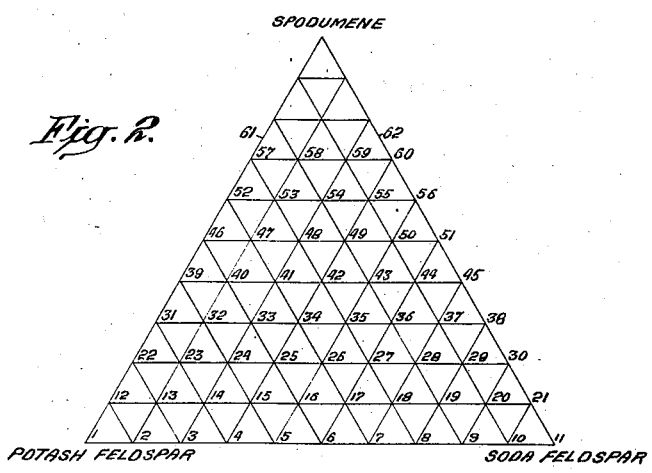

To compare data on both potash and soda feldspar the triaxial system was used. Points at ten percent intervals between the three materials were investigated. The triaxial diagram is shown in Fig. 2 giving the order of the numbering of the points. No mixtures containing more than 75 percent spodumene were tested because these mixtures have a higher P. C. E. than could be reached in the kiln used.

All test cones were made to conform in size and shape to standard Orton cones. The test cones were set in fire clay pats at an angle of 82° from the horizontal and were placed in the kiln about six inches from a similar pat of the standard cones. Results were recorded in terms of pyrometric cone equivalents (P. C. E.). To record results as closely as possible the down positions of the test cones were recorded in terms of the position of the standard cones with respect to a clock face. For example, test cone No. 1 was in down or 6 o'clock position, when standard cone No. 8 reached 5 o'clock position. In recording the fusions this is expressed as test cone $1=8^5$ in Table No. 4.

Table No. 4, shown below, gives a list of the points on the triaxial diagram tested, their percentage composition, and P. C. E. values. All mixtures that gave erratic results were checked.

TABLE No. 4

Pyrometric cone equivalent of points on triaxial diagram of Fig. 2

| Point | Percent K spar | Percent Na spar | Percent spod. | P. C. E. | Point | Percent K spar | Percent Na spar | Percent spod. | P. C. E. |
|---|---|---|---|---|---|---|---|---|---|
| 1 | 100 |  |  | $8^5$ | 32 | 60 | 10 | 30 | $1^5$ |
| 2 | 90 | 10 |  | $8^3$ | 33 | 50 | 20 | 30 | $01^6$ |
| 3 | 80 | 20 |  | $7^6$ | 34 | 40 | 30 | 30 | $01^5$ |
| 4 | 70 | 30 |  | $7^4$ | 35 | 30 | 40 | 30 | $01^5$ |
| 5 | 60 | 40 |  | $7^2$ | 36 | 20 | 50 | 30 | $1^2$ |
| 6 | 50 | 50 |  | $6^6$ | 37 | 10 | 60 | 30 | $1^6$ |
| 7 | 40 | 60 |  | $6^5$ | 38 |  | 70 | 30 | $2^5$ |
| 8 | 30 | 70 |  | $6^5$ | 39 | 60 |  | 40 | $3^3$ |
| 9 | 20 | 80 |  | $6^6$ | 40 | 50 | 10 | 40 | $2^4$ |
| 10 | 10 | 90 |  | $7^2$ | 41 | 40 | 20 | 40 | $1^5$ |
| 11 |  | 100 |  | $7^4$ | 42 | 30 | 30 | 40 | $1^2$ |
| 12 | 90 |  | 10 | $4^6$ | 43 | 20 | 40 | 40 | $1^3$ |
| 13 | 80 | 10 | 10 | $4^4$ | 44 | 10 | 50 | 40 | $2^2$ |
| 14 | 70 | 20 | 10 | $4^2$ | 45 |  | 60 | 40 | $3^3$ |
| 15 | 60 | 30 | 10 | $3^5$ | 46 | 50 |  | 50 | $4^6$ |
| 16 | 50 | 40 | 10 | $3^3$ | 47 | 40 | 10 | 50 | $3^6$ |
| 17 | 40 | 50 | 10 | $3^2$ | 48 | 30 | 20 | 50 | $3^2$ |
| 18 | 30 | 60 | 10 | $3^3$ | 49 | 20 | 30 | 50 | $3^3$ |
| 19 | 20 | 70 | 10 | $3^5$ | 50 | 10 | 40 | 50 | $4^3$ |
| 20 | 10 | 80 | 10 | $4^2$ | 51 |  | 50 | 50 | $4^6$ |
| 21 |  | 90 | 10 | $5^5$ | 52 | 40 |  | 60 | $8^3$ |
| 22 | 80 |  | 20 | $3^3$ | 53 | 30 | 10 | 60 | $8^6$ |
| 23 | 70 | 10 | 20 | $2^3$ | 54 | 20 | 20 | 60 | $8^3$ |
| 24 | 60 | 20 | 20 | $1^4$ | 55 | 10 | 30 | 60 | $8^2$ |
| 25 | 50 | 30 | 20 | $01^5$ | 56 |  | 40 | 60 | $7^6$ |
| 26 | 40 | 40 | 20 | $01^4$ | 57 | 30 |  | 70 | $10^5$ |
| 27 | 30 | 50 | 20 | $01^6$ | 58 | 20 | 10 | 70 | $11^2$ |
| 28 | 20 | 60 | 20 | $1^4$ | 59 | 10 | 20 | 70 | $10^6$ |
| 29 | 10 | 70 | 20 | $2^4$ | 60 |  | 30 | 70 | $10^6$ |
| 30 |  | 80 | 20 | $3^4$ | 61 | 25 |  | 75 | $12^4$ |
| 31 | 70 |  | 30 | $2^4$ | 62 |  | 25 | 75 | $13^3$ |

Figure 3:
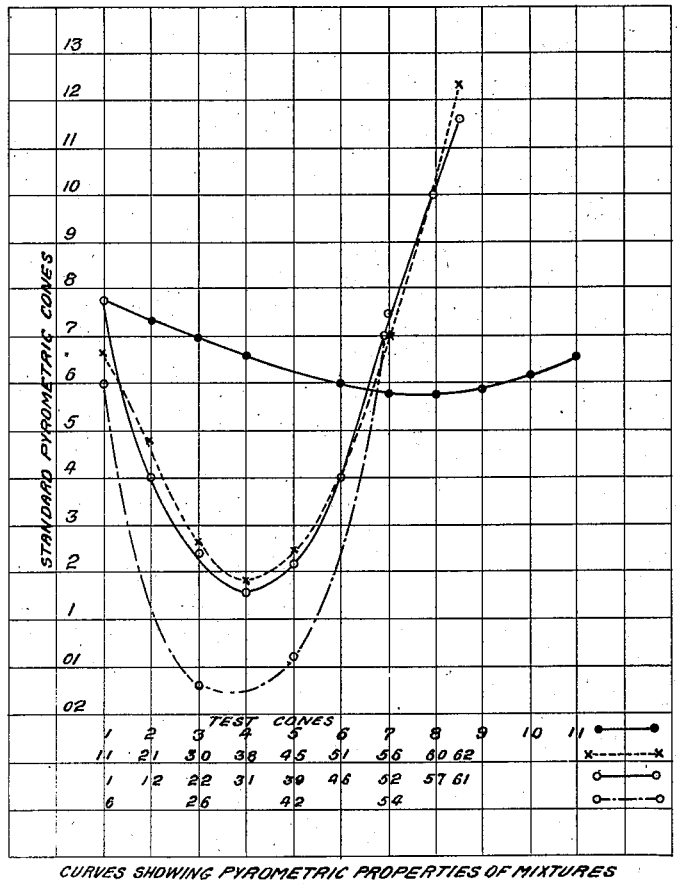

To show more clearly the effects of additions of spodumene to feldspar, four curves were plotted showing the relation of P. C. E. to percentage composition. These curves are shown in Fig. 3. The four curves cover potash-soda feldspar, potash feldspar-spodumene, soda feldspar-spodumene, and soda-potash feldspar-spodumene.

Figure 4:
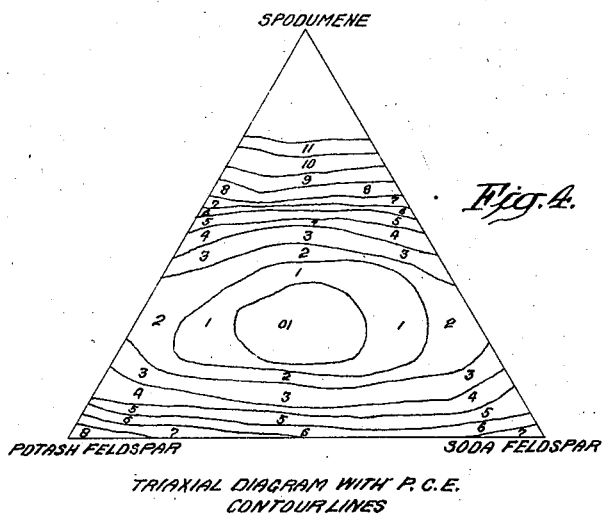

Besides these curves additional graphic data are shown by the triaxial diagram of Fig. 4 with "contour lines" drawn through points of equal P. C. E. values. As the points investigated were spaced on 10 percent intervals, and as no determinations were made between these points, the location of the lines or margins between the areas of different cone values are not established with exactitude. However, the contours serve to show the approximate areas of equal P. C. E. values and illustrate the rapid changes in fusion properties with changes in composition.

These results show that additions of twenty to forty percent of spodumene to either of the individual feldspars, or mixtures of them, decreases the P. C. E. several cones. As the spodumene is increased above forty percent the P. C. E. of the mixtures increase. The rate of increase in P. C. E. for mixtures with increasing amounts of spodumene above forty percent is about equal to the rate of decrease in P. C. E. of mixtures containing from zero to twenty percent spodumene.

From the four curves shown in Fig. 3 it can be seen that the mixtures containing spodumene have a much steeper slope than those containing only the feldspars. The solid line curve for the binary system potash feldspar-spodumene shows that the spodumene additions decrease the P. C. E. more rapidly and to slightly greater extent than they do in the soda feldspar-spodumene mixtures shown by the dotted line. The dot dash curve representing the fifty-fifty blend of the two feldspars shows that the mixture is affected by the additions of spodumene to a greater extent than either of the feldspars alone. The steep slopes and relatively sharp points of the curves indicate the probability of a eutectic point between feldspars and spodumene.

The contour lines on the triaxial diagram of Fig. 4 shows a considerable area as having P. C. E. values below cone No. 1. These compare with a P. C. E. of about six to eight for the feldspars and considerably higher for the spodumene.

The area of lowest P. C. E. values has limits of composition approximately as follows:

|  | Maximum | Minimum |
| --- | --- | --- |
|  | Per cent | Per cent |
| Spodumene | 35 | 15 |
| Potash feldspar | 50 | 25 |
| Soda feldspar | 50 | 20 |

These limits expressed in terms of chemical constituents as calculated from the analyses are as follows:

|  | Maximum | Minimum |
| --- | --- | --- |
|  | Per cent | Per cent |
| $Li_2O$ | 2.5 | 1.1 |
| $K_2O$ | 6.2 | 3.2 |
| $Na_2O$ | 5.1 | 3.2 |

In manufacturing ceramic bodies such as porcelain, tile, etc., the material is satisfactory for the purpose of this invention in substantially the condition in which it is obtained from the mine in the case of the pegmatite material, or as the product of the mill when the concentrates are employed. These concentrates may be obtained by the processes known to the art, such as water or air concentration, air or water flotation, or decrepitation. Should either the pegmatite material or the concentrates be too high in iron for the ceramic products in which it is to be used, then the iron may be reduced by the known processes of magnetic separation, electrostatic separation, flotation or leaching.

In manufacturing ceramic products containing spodumene, the spodumene pegmatite or spodumene concentrates may first be pulverized to suitable fineness, after which they may be mixed with the other ingredients contained in the formula in proportions ranging from 10% spodumene to 60% spodumene. The spodumene to a certain extent replaces the feldspar as a flux, and when using the spodumene pegmatite, which already contains feldspar as a natural constituent, a larger proportion of the pegmatite may be used to obtain the same flux ratio.

The principal other ingredients in these ceramic formulae will be clay, feldspar, pyrophyllite, talc, whiting and silica. Accessory ingredients may be added as required for the specific ceramic product being manufactured.

All the ingredients are then mixed with the necessary amount of water and in accord with customary practice passed through the various processes of blunging, deairing, extruding, ageing, forming, drying, firing, etc.

The advantage of using spodumene as an essential ingredient in these formulae is that it unites with the other constituents, especially the feldspars in such a way as to provide vitrification at a lower temperature than either the spodumene or feldspar used separately. This is beneficial in reducing the fuel cost of ceramic bodies and the time of firing which results in other cost economies.

In glazes the spodumene forms a glass of low viscosity and makes it possible to produce special, high silica high fired, glazes having desirable mechanical strength and working properties. In combination with certain materials used in the preparation of glazes its properties permit special low fired glazes to be produced economically.

The invention claimed is:

1. A ceramic flux composition less vitreous than glass consisting of a mixture of potash-soda bearing aluminum silicate minerals and 10–60% spodumene.

2. A ceramic composition comprising a mixture of spodumene and potash-soda bearing aluminum silicate minerals, having a pyrometric cone equivalent lower than that of either the spodumene or the other minerals alone.

3. A ceramic composition comprising a mixture of spodumene, potash feldspar and soda feldspar in the following proportions: spodumene 15–35%, potash feldspar 25–50%, and soda feldspar 20–50%.

4. A ceramic body comprising a mixture of clay, feldspar containing potash and soda, and 10–60% spodumene.

5. A ceramic body comprising a mixture of clay, feldspar containing potash and soda and from 20–40% spodumene.

6. A ceramic flux composition less vitreous than glass comprising potash-soda minerals and sufficient lithia minerals to provide 0.7 to 4.2% $Li_2O$.

7. A ceramic flux composition less vitreous than glass comprising feldspar containing potash and soda and 10–60% spodumene.

8. A ceramic flux composition less vitreous than glass consisting of a mixture of potash, soda and lithia minerals in proper proportions to provide alkalies in the following proportions:

Per cent $Li_2O$—lithia _____ 0.7 to 4.2
$K_2O$—potash _____ 2.4 to 7.3
$Na_2O$—soda _____ 1.9 to 5.6

9. A ceramic flux composition less vitreous than glass comprising a mixture of feldspars containing potash and soda and spodumene and having pyrometric cone equivalent values of from cone 01 to 5.

10. A ceramic composition comprising a mixture of spodumene, potash feldspar and soda feldspar in the following proportions: spodumene 10-60%, potash feldspar 20-60%, and soda feldspar 20-60%.

11. A ceramic composition comprising a mixture of potash, soda and lithia minerals having pyrometric cone equivalent values of from cone 01 to 5.

BLANDFORD C. BURGESS.
JOHN E. BOYD, Jr.